| Na PETROLEUM SULFONATE (MW=430), % | SULFATED $C_{12-15}$ ETHOXYLATED ALCOHOL % | TOTAL SURFACTANT, % | NaCl, M |
|---|---|---|---|
| ○ 4.0 | 1.0 | 5.0 | 0.9 |
| △ 2.4 | 0.6 | 3.0 | 0.9 |
| □ 0.8 | 0.2 | 1.0 | 0.9 |

THE EFFECT OF SURFACTANT CONCENTRATION ON PETROLEUM RECOVERY
—PETROLEUM SULFONATE, SULFATED ETHOXYLATED ALCOHOL MIXTURE—

INVENTORS:
GEORGE SMITH
JOSEPH REISBERG
JIMMIE B. LAWSON
BY:
THEIR AGENT

CHEM. FLOOD COMP:
Na PETROLEUM SULFONATE (MW = 430)   3.5 %
SULFATED $C_{12-15}$ ETHOXYLATED ALCOHOL   1.5 %
$CaCl_2$   0.25 M

RECOVERY OF PETROLEUM WITH A PETROLEUM SULFONATE-SULFATED ETHOXYLATED ALCOHOL SYSTEM

| Na PETROLEUM SULFONATE (MW=430), % | SULFATED C$_{12-15}$ ETHOXYLATED ALCOHOL % | NaCl, M | CaCl$_2$, M |
|---|---|---|---|
| ○ 4.0 | 1.0 | 0.7 | 0.01 |
| △ 2.4 | 0.6 | 0.7 | 0.01 |

RECOVERY OF PETROLEUM WITH A PETROLEUM SULFONATE-
SULFATED ETHOXYLATED ALCOHOL SYSTEM

INVENTORS:
GEORGE SMITH
JOSEPH REISBERG
JIMMIE B. LAWSON
BY:
THEIR AGENT

CHEM. FLOOD COMP:
Na PETROLEUM SULFONATE (MW=430) 4.0 %
SULFATED $C_{12-15}$ ETHOXYLATED ALCOHOL 1.0 %
NaCl 0.7 M
$CaCl_2$ 0.01 M

RECOVERY OF PETROLEUM WITH CHEMICAL SLUGS

United States Patent Office 3,508,612
Patented Apr. 28, 1970

3,508,612
WATERFLOOD OIL RECOVERY USING CALCIUM-COMPATIBLE MIXTURE OF ANIONIC SURFACTANTS
Joseph Reisberg, Houston, Tex., Jimmie B. Lawson, Pinole, Calif., and George Smith, Houston, Tex., assignors to Shell Oil Company, New York, N.Y., a corporation of Delaware
Filed Aug. 15, 1968, Ser. No. 752,882
Int. Cl. E21b 43/22
U.S. Cl. 166—274        12 Claims

ABSTRACT OF THE DISCLOSURE

An improved method for recovering oil from underground formations by pretreating said formation prior to or during the injection of an aqueous drive fluid, with a saline solution containing a synergistic mixture of an organic sulfonate surfactant and a sulfated oxyalkylated organic material surfactant.

BACKGROUND OF THE INVENTION

Figure 1:
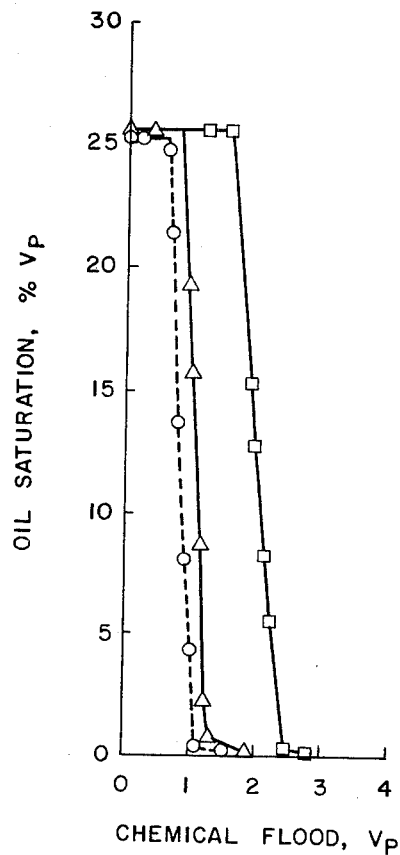

This invention relates to the displacement of oil from the pores of subterranean, oil-containing reservoirs, and more particularly to special surface-active systems to be used with "waterflooding" techniques to improve the oil displacement efficiency of waterfloods.

Knowledge is widespread in the oil industry that the so-called "primary recovery" techniques, which include natural flow, gas lifting, gas repressurization and pumping methods, leave substantial quantities of oil in oil-bearing reservoirs. In addition, there are oil-bearing reservoirs which even though containing large quantities of oil, are incapable of being produced by primary recovery techniques. Recognition of the large amount of residual oil in many oil-producing reservoirs has led to the use of the so-called "secondary recovery" techniques which have as their primary purpose the economical recovery of additional quantities of the residual oil known to be present in the reservoir.

Probably one of the more common secondary recovery techniques is the so-called "waterflooding" in which aqueous fluids are injected at one point in the reservoir at pressures sufficient to be forced out into the reservoir and toward a spaced production well or wells, thus, in effect, displacing oil from the pores of the reservoir and driving the oil ahead of the water front.

However, waterflooding is only advantageous when the cost of injecting water and necessary chemical modifiers is less than the value of the oil recovered. Therefore, the displacement efficiency of waterfloods has been the determining factor of whether such a technique will be used.

Generally, the difficulty with waterfloods is that the small pores and capillaries of the reservoir contain hydrocarbons (oil and/or oil and gas) which are generally water immiscible. The existence of high interfacial tensions between the boundary of the water and hydrocarbons seriously impedes the ability of the water to displace oil trapped in the reservoir by capillarity.

Since in many oil reservoirs the oil tends to be trapped within pores of the interconnected capillary system of the rock formations by capillarity, merely forcing water therethrough will not displace much of this trapped oil. However, a reduction in the interfacial tension between the water and the oil will tend to increase the amount of oil that will be displaced by the water. Thus, various aqueous surfactant systems have been proposed for use in waterflooding processes for recovering oil. In many such prior systems the interfacial tension between the oil and water is reduced from a characteristic value in the order of 50 dynes per centimeter to a value of from about 1 to 10 dynes per centimeter. If the interfacial tension is reduced to only about 1 to 10 dynes per centimeter the increase in the amount of oil that can be recovered is not generally significant. Thus, the cost of obtaining the reduction in the interfacial tension is apt to be more than the value of the increased amount of oil that is recovered in many cases.

Many aqueous systems containing surfactants have been used to aid in oil recovery and among the most promising of such systems are those described in U.S. Pats. 3,330,344; 3,348,611 and 3,366,174 in which improved and effective oil recovery is achieved by a waterflood in which a frontal portion is an aqueous liquid containing an oil-solubilizing aqueous solution of surfactant micelles that are combined with molecules of an amphiphilic organic compound of low water solubility. In such systems the concentration of the surfactant in the aqueous solution exceeds the critical concentration for micelle formation and the amphiphilic material swells or becomes associated with the surfactant micelles and causes the aqueous solution to exhibit little or no interfacial tension against the oil.

Although the surfactant systems described in the above cited patents are generally effective, their beneficial effects tend to be reduced when polyvalent metal ions are present in the earth formation. Such ions tend to cause the precipitation of the surfactant and the plugging of the pores of the earth formation. In addition, the surfactant materials used in such prior systems tend to be adsorbed to an extent that is disadvantageous on the surfaces of oil-containing earth formations.

SUMMARY OF THE INVENTION

It has now been discovered that a waterflooding oil recovery process can be effectively improved and the above-mentioned compatability, plugging and surfactant adsorption problems obviated by incorporating into at least a frontal portion of the flood water, a slug of an aqueous saline solution containing a synergistic mixture of dissimilar anionic surfactants at least one of which is an alkali metal or ammonium or amine salt of an organic sulfonate and at least one of which is an alkali metal or ammonium or amine salt of a sulfated oxyalkylated organic material. The salinity of the solution can be controlled by any suitable means such as by addition of an electrolyte such as Na, K and/or Li chloride, bromide, iodide and mixtures thereof to which can be added optionally a small amount of a polyvalent metal salt such as the corresponding halides of alkaline earth metals, e.g., $CaCl_2$, $BaCl_2$ and the like. Saline solutions containing NaCl and optionally $CaCl_2$ are preferred and such solutions can be dilute, or concentrated solutions and preferably comprise brine solutions containing from about 0.01 to 5 M NaCl and from about 0 to 0.1 M $CaCl_2$. Such saline solutions can advantageously be formulated from saline source waters such as subterranean brines, sea waters, etc. Where the oil-containing earth formation contains a highly saline connate water the electrolyte concentration of the aqueous saline solution of surfactants is preferably near the lower portion of the range of suitable concentration. The total concentration of the anionic surfactant mixture can vary from about 1% to about 20% by weight of which the sulfonate surfactant can comprise from about 10% to 90% of the mixture with the balance being the sulfated surfactant. The optimum ratio of the sulfonate to sulfate material depends on the molecular weight of the sulfonate, the presence of polyvalent ion-containing electrolytes and other electrolytes in the formation and other factors. Generally, the higher molecular weight sulfonates are preferably used with large proportions of the sulfate material and the lower molecular weight sulfonates are used with smaller proportions of sulfate material. Also if a large amount of electrolyte is present in the saline solution, the sulfate material concentration should be increased proportionately.

DESCRIPTION OF THE PREFERRED EMBODIMENT

The organic sulfonate useful as one of the additives in the saline solution slug can be substantially any surfactant salt of an organic sulfonate provided it possesses surfactant-amphiphile properties generated by the oil-solubility versus water-solubility spectrum of the sulfonate. In such surfactant sulfonates the oil-soluble (generally higher molecular weight) constituents serve as amphiphiles and are solubilized in the aqueous system by the primarily water-soluble (generally lower molecular weight) sulfonates. Anionic sulfonuate surfactants of this type can be illustrated by metal or ammonium salts of sulfonate surfactants, e.g., alkali metal, ammonium or polyvalent metal salts of sulfonated petroleum hydrocarbons such as alkylated naphthalene sulfonates, alkylated benzene sulfonates; or the sulfocarboxylate salts, and the like. Preferred sulfonates are the alkali metal (Na, K, Li) salts of petroleum sulfonates such as $C_{15-30}$ alkyl aryl sulfonates, alkylated benzene sulfonates and the like. Materials of this type are sold commercially under various trade names such as petroleum sulfonates sold by Bray Chemical Company or the Bryton Chemical Company as Bryton sulfonate, F, 430, 467, 500, or the Sonneborn Chemical Company as Petronates, or the Socony Mobil Oil Company as "Promor" sulfonates of the SS-6, SS-20 series; American Cyanamid's "Aerosol OT" which is Na dioctyl sulfosuccinate and the like. A preferred sulfonate mixture is a sodium salt of a petroleum sulfonate in the molecular weight range of 350–420 and a sodium salt of a petroleum sulfonate in the molecular weight range of 420–580 or a sodium salt of a mixture of petroleum sulfonates having an average molecular weight in the order of about 430–470.

The sulfated polyoxyalkylated organic material surfactant can be prepared by suitable means such as sulfating with chlorosulfonic acid, sulfur trioxide, sulfonic acid, oleum or sulfuric acid in a suitable solvent, a surface-active water soluble oxyalkylated organic material having from about 8 to about 20 carbon atoms and represented by the general Formula I represented by RO $$(R'—O)_x—(R''O)_y—(R'O)_z—H$$

where R is an alkyl radical or organic moiety of 8 to 20 and preferably 10–15 carbon atoms, R' and R" are dissimilar alkyl radicals or groups from 1–6 carbon atoms and preferably are $—C_2H_4—$ and $—C_3H_6—$ radicals, respectively, x and z are positive integers of at least 1 and y can be zero or a positive integer as x or z. Preferred materials comprise oxylated alcoholic compounds such as oxyalkylated alkanols which can be represented by the general Formula II represented by $RO—(C_2H_4O)_{2-10}—H$ where R is an alkyl radical of 10–15 carbon atoms, the alcohol used in the ethoxylation being a mixture of alcohols of 10 to 15 carbon atoms. The ethoxylation of the alcohols can be accomplished by means well known in the art. The ethoxylation of primary alcohols to form products represented by Formula II can be achieved using a strong base of Lewis acid catalysts such as NaOH, $BF_3$ or $SnCl_2$. Oxyalkylated primary alcohols represented by Formulas I and II can be prepared by the method described in U.S. Patents 3,036,130 or 3,101,574 or as described in copending patent application to Tsatsos et al., Ser. No. 661,546, filed Aug. 18, 1967, now abandoned.

The sulfation of such a surface-active polyethoxylated material can be accomplished by reacting neat or in the presence of a solvent using as the sulfating agent any of the materials mentioned previously and preferably sulfur trioxide, chlorosulfonic acid or sulfuric acid. Thus, any of the ethoxylated alcohols can be sulfated by dissolving the alcohol in a solvent such as ethyl ether and adding dropwise chlorosulfonic acid keeping the temperature at 0–10° C. The HCl formed is removed by bubbling $N_2$ through the solution and the solution neutralized by adding gradually an aqueous methanol solution containing theoretical amounts of base. The solvent is then removed if desired. The sulfation can be also practiced without the use of a solvent Example A.

Sulfates of ethoxylated primary alcohols are commercially available from Shell Chemical Company under the trade name Neodol 23–3A having the formula $C_{12-13}O(CH_2CH_2O)_3SO_3NH_4$ and Neodol 25–3S $C_{12-15}O(CH_2CH_2O)_3SO_3Na$ which compounds having the following properties as shown in Table 1.

TABLE 1.—TYPICAL PHYSICAL AND CHEMICAL PROPERTIES OF Na SULFATED $C_{12-15}$ ALCOHOL DERIVATIVES

| Property | Na Sulfated $C_{12-15}$ Alcohol Ethoxysulfates | |
|---|---|---|
| | 23–3A | 25–3S |
| Molecular wieght | 423 | 441 |
| Active content, percent weight | 59 | 59 |
| EO content, percent weight | 31.2 | 29.8 |
| Melting range, ° C | | |
| Color, APHA | [1] 35 | [1] 35 |
| Sp. gravity, 25/25° C | 1.01 | 1.02 |
| Ethanol, percent weight | 14 | 14 |
| UOM [2], percent weight | 2.5 | 2.5 |
| Inorganic salt, percent weight | 1.0 | 1.0 |
| Odor | Mild | Mild |
| pH | 7.3 | 7.7 |

[1] Klett color.  [2] Unsulfated organic matter.

Other anionic sulfated ethoxylated alcohols are available from Union Carbide under the trade name Tergitol S such as Tergitol Anionic 14–S–3A (ammonium salt) or 15–S–3.0 (sodium salt) having the formula:

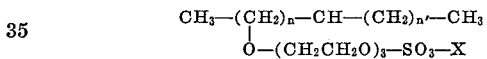

where X is $NH_4$ or Na and which have the following properties:

TABLE 2

| Property | Tergitol Anionic [1] | |
|---|---|---|
| | 15–S–3A [2] | 15–S–3S [3] |
| Alkyl carbon range | $C_{11}$ to $C_{15}$ | |
| Average moles of ethylene oxide | 3 | 3 |
| Molecular weight | 435 | 440 |
| Color, platinum-cobalt [4] | 60 | 60 |
| Odor | Mild and characteristic | |
| Cloud point, 1.0% aqueous solution, °F | | |
| Pour point, °F | −33 | −49 |
| pH, 1.0% aqueous solution, at 77° F | [5] 6.5–7.5 | [5] 8.0–10.0 |
| Solubility in water at 77° F | Soluble | Soluble |
| Apparent specific gravity at 25/25° C | 1.039 | 1.057 |
| Pounds per gallon at 68° F | 8.65 | 8.80 |
| Viscosity, cks.: | | |
| At 68° F | 43 | 49 |
| At 104° F | 22 | 23 |
| At 212° F | | |
| HLB Number | | |
| Flash point, ° F. Cleveland Open Cup (ASTM Methld D 92). | 195 | [6] 172 |

[1] Composition: ethoxysulfate.
[2] Cation: ammonium.
[3] Cation: sodium.
[4] 10% solution in water; Klett-Summerson units.
[5] Determined on a 2% aqueous solution.
[6] Determined by ASTM Method D 1310 using Tag open cup.

Salts of sulfated polyoxylated alkyl phenols also can be used in combination with organic sulfonates.

The effectiveness of waterflooding an oil-containing underground formation with an aqueous liquid in which at least a frontal portion comprises a slug of saline solution containing the additive mixture of the present invention, namely sulfonate surfactant mixed with sulfated polyoxyalkylated surfactant, e.g., Na petroleum sulfonate (Av. M.W.=430 or 470) and Na sulfate $C_{12}$–$C_{15}$ alcohol (3–9 EO) to aid in oil recovery is illustrated by the data presented below. The waterflooding fluid used in the test was a slug of saline solution containing the sulfonate-sulfate surfactant mixture followed by water or thickened water in which the thickening agent was a water-soluble salt of a hydrolyzed polyacrylamide of high molecular weight (1–10 million) and available commercially from Dow Chemical Company under the trade name "Pusher 520" or "ET–601" or Separan NP10, NP20, AP30, AP273, P62 or Mydel 550 as described in U.S. Pats. 3,002,960; 3,022,279; 3,039,529; 3,074,481; 3,369,977 and 3,370,649.

System (I).—Saline system tested contained sodium salt of petroleum sulfonates having an average M.W.=430 and Na sulfated polyethylated primary alcohol Na sulfated $C_{12-15}$ alcohol (3 EO).

Effect of surfactant concentration

Results of crude oil displacement from sand packs containing about 25% VP residual oil with 5%, 3% and 1% surfactant solutions are shown in FIGURE 1. The results of the 5% and 3% flooding solutions show that recovery is essentially complete in 1¼ PV of flood. The comparison shows that additive concentrations significantly lower than 1% surfactant should be avoided because of the increasing inefficiency of such systems.

Calcium tolerance

Figure 2:
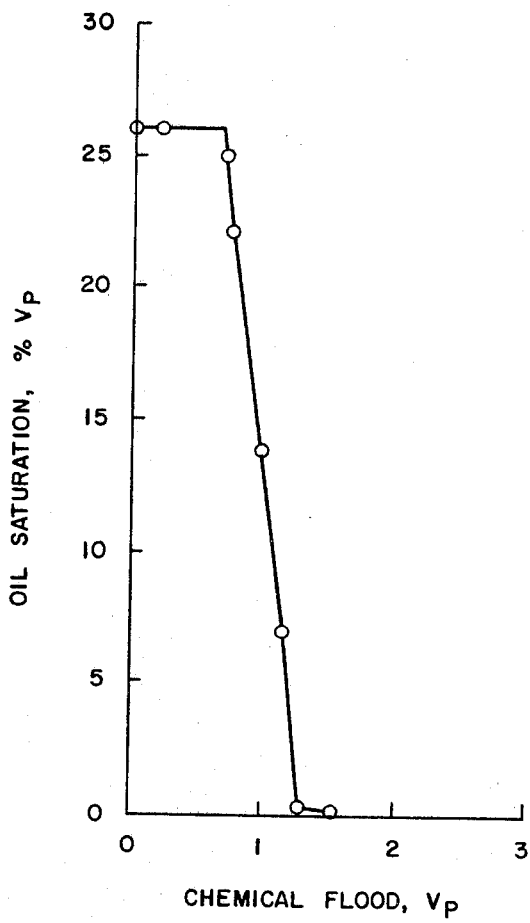

Calcium compatibility increases with increases in Na sulfated $C_{12-15}$ alcohol sulfate content. Soluble systems containing about 2 molar calcium chloride can be obtained with equal parts of the Na sulfated $C_{12-15}$ alcohol sulfate and petroleum sulfonate. Experiments were performed to ascertain the maximum concentration of calcium which the mixed surfactant system will tolerate and yet displace oil efficiently. With 5% solutions of the surfactants, the most favorable oil displacement occurs at a 30/70 ratio of Na sulfated $C_{12-15}$ alcohol (3 EO) to Na petroleum sulfonate (M.W.=430) in 0.25 M $CaCl_2$ (approximately 25,000 p.p.m. calculated as $CaCO_3$). In the absence of the Na sulfated $C_{12-15}$ alcohol (3 EO), the same petroleum sulfonate flocculated in the presence of only about 800 p.p.m. $Ca^{++}$. The displacement of crude oil from a sand pack with the surfactants mixed in the 30/70 ratio is shown in FIGURE 2. Total oil recovery is obtained with 1.3 PV of chemical flood.

A study was also made of the effect of mixtures of NaCl and $CaCl_2$ in a petroleum sulfonate —Na sulfated $C_{12-15}$ alcohol (3 EO) systems, and it was noted that a synergistic relationship exists between small amounts of calcium and the sodium chloride. In addition to the fact that the petroleum sulfonate —Na sulfated $C_{12-15}$ alcohol (3 EO) systems can tolerate sizeable amounts of calcium in the presence of NaCl the combination of 0.01 M $CaCl_2$ (about 400 p.p.m. $Ca^{++}$) and 0.7 M NaCl in surfactant system water, the viscosity ratio of the water to the slug is relatively low. The use of polymer solution to improve that viscosity ratio increased the oil recovery by more than 10% PV at a cumulative injection of 1 PV of fluids. Viscosity enhancing materials such as the above polymer solutions can advantageously be incorporated in the aqueous saline solution containing the sulfate and sulfonate surfactants and/or in aqueous solutions injected ahead or behind the solution containing the surfactants.

Figure 5:
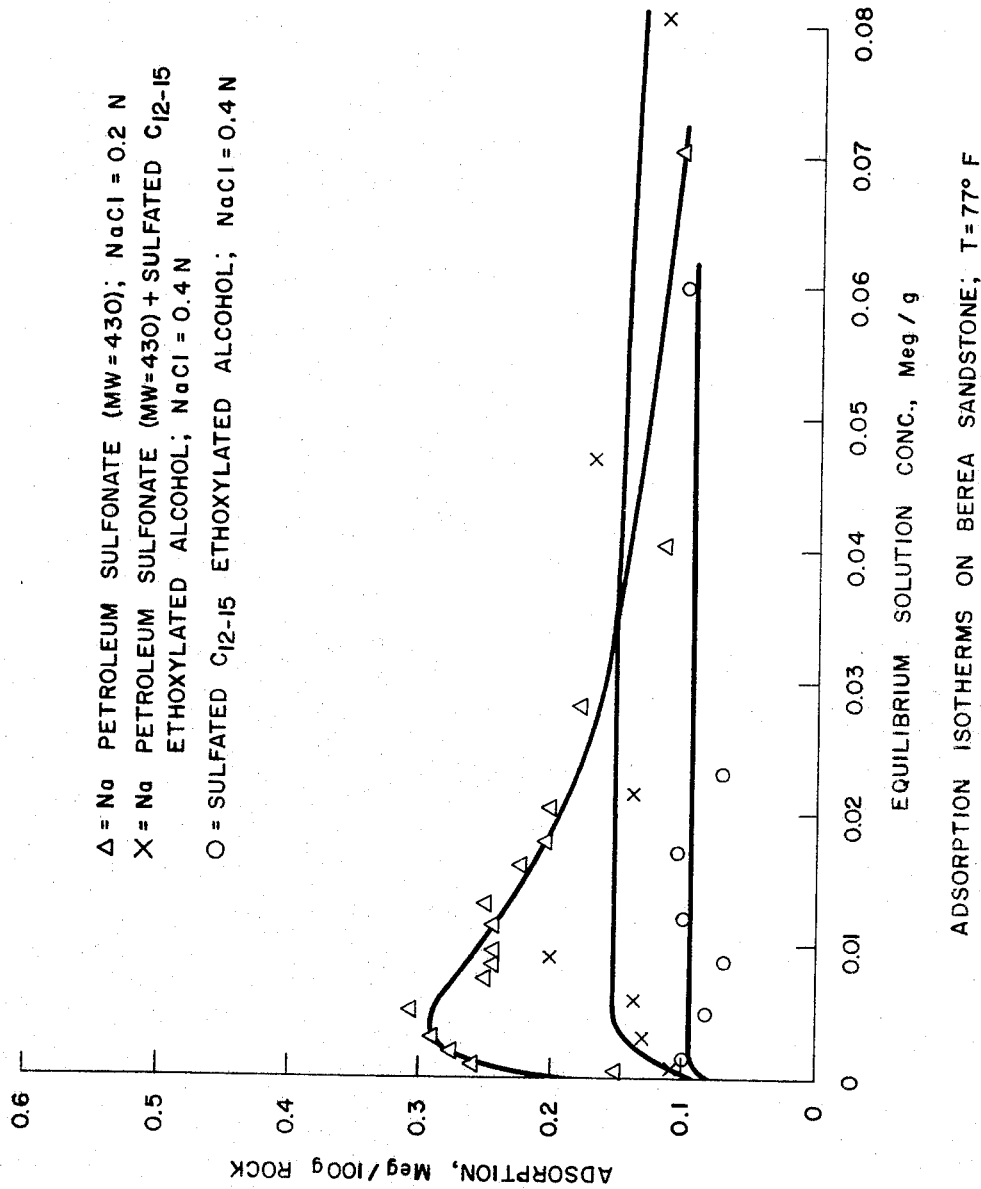
Figure 6:
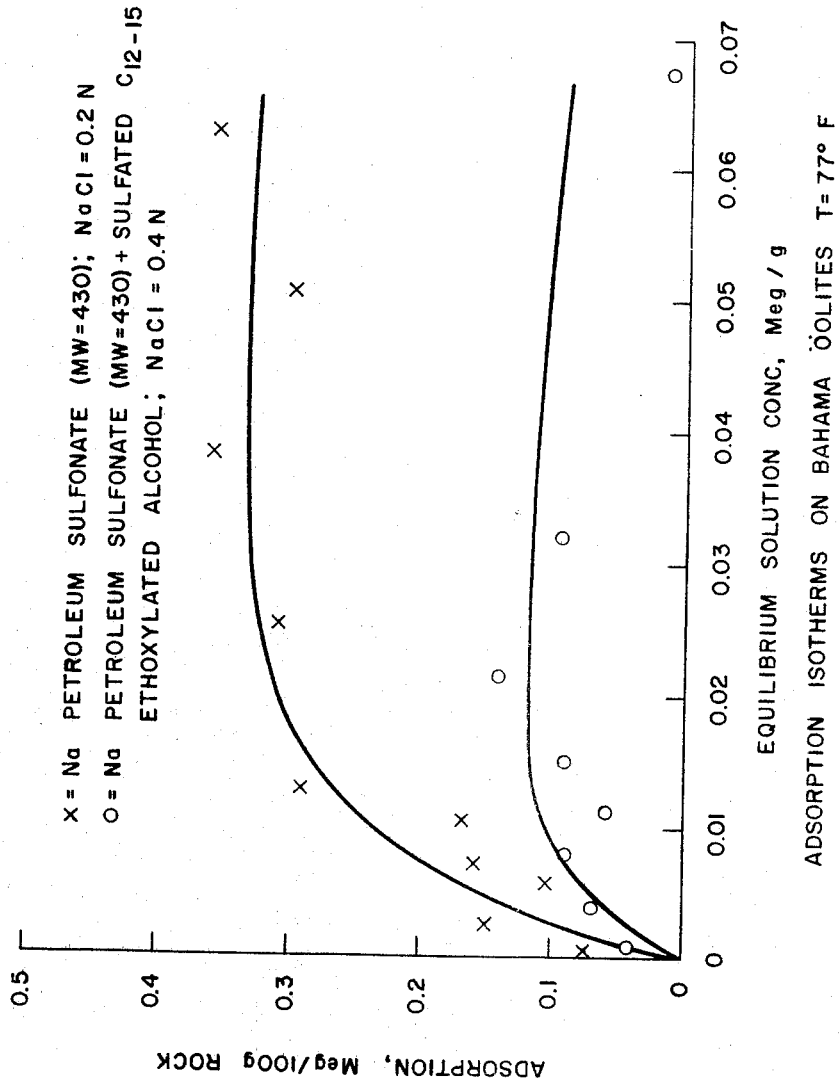

To summarize FIGURES 1–4 represent oil displacement curves showing the effect of additive concentration (FIGURE 1), the effects of $CaCl_2$ or mixtures of NaCl and $CaCl_2$ (FIGURES 2 and 3, respectively) and the effect of polymer drive over a water drive (FIGURE 4) in the additive system of the present invention. The absorptive effects of additive mixture of the present invention is shown in FIGURE 5 and fully discussed in Col. 7 of the specification and the superiority of the sulfated alcohol (Neodol 25–3S) to petroleum sulfonate alone as absorbants on carbonate formations is illustrated by FIGURE 6, fully discussed in Col. 8 of the specification.

In an aqueous solution containing 5% Na petroleum sulfonate (M.W.=430) in water, at room temperature, the optimum concentration of sodium chloride for oil recovery is about 0.25 M and at a sodium chloride concentration of 0.35 M the aqueous system separates into two phases. When a portion of the sulfonate is replaced by Na sulfated $C_{12-15}$ alcohol (3 EO) to form a 30/70 ratio of Na sulfated $C_{12-15}$ alcohol to sulfonate the optimum concentration of sodium chloride is increased to between about 0.7 and 1.0 M. Thus, the incorporation of a relatively small proportion of the sulfated polyoxyalkylated surfactant provides a large increase in both the optimum concentration of and tolerance to electrolytes. Further, the presence of calcium ions does not tend to inhibit recovery efficiency (as it does in the absence of such a sulfate), and, to some extent, may enhance the recovery. The incorporation of the sulfated polyoxyalkylated surfactant has the further advantage of causing most of the oil to be produced as a bank, free of emulsion.

Tests in consolidated cores

Oil displacement experiments were performed with Berea cores using mahogany sulfonate-Na sulfated $C_{12-15}$ alcohol blends shown in Table 3. The cores had a length of 10 inches, a diameter of 2 inches, a permeability of 500 md. and were flooded at the rate of 1 foot per day.

TABLE 3.—CHEMICAL FLOODING OF BEREA CORES WITH MAHOGANY SULFONATE-Na SULFATED $C_{12-15}$ ALCOHOL SYSTEMS

| Composition, chemical flood | | Oil saturation (percent VP) after flooding with— | | |
|---|---|---|---|---|
| Surfactant | Electrolyte | Water-flood | 1 VP chemical flood | 1.5 VP chemical flood |
| 5% Na petroleum sulfonate (M.W.=430) | 0.25 M NaCl | 40.7 | 10.7 | 9.3 |
| 4% Na petroleum sulfonate (M.W.=430) <br> 1% Na sulfated $C_{12-15}$ alcohol (3 EO) | } 0.7 M NaCl | 41.0 | 7.8 | 5.6 |
| 4% Na petroleum sulfonate (M.W.=430) <br> 1% Na sulfated $C_{12-15}$ alcohol (3 EO) | } 0.7 M NaCl <br> 300 p.p.m. $Ca^{++}$ | 40.7 | 5.6 | 4.4 |

Figure 3:
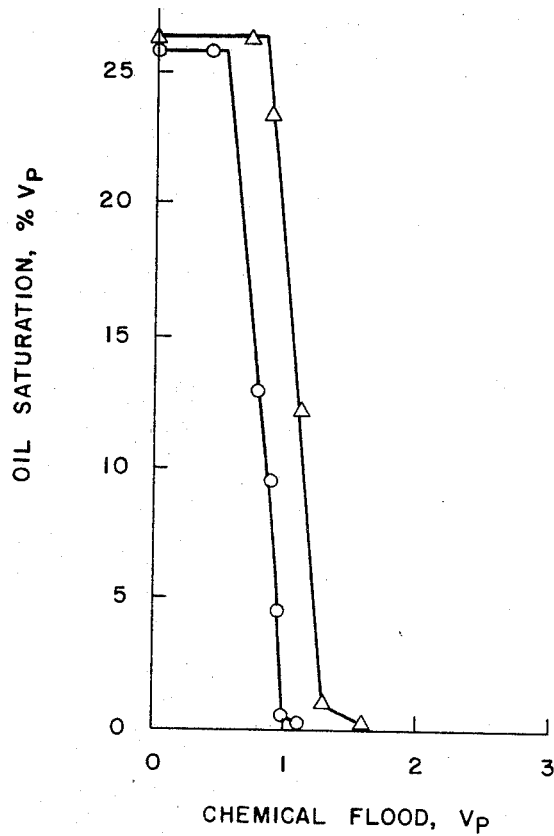

(I) consisting of 2.4% or 4% Na petroleum sulfonate (M.W.=430) and 0.6% or 1% Na sulfated $C_{12-15}$ alcohol (3 EO) provides excellent oil recovery. The recovery curve for this system is shown in FIGURE 3.

Tests of chemical slugs with polymer drives in unconsolidated sand packs

Figure 4:
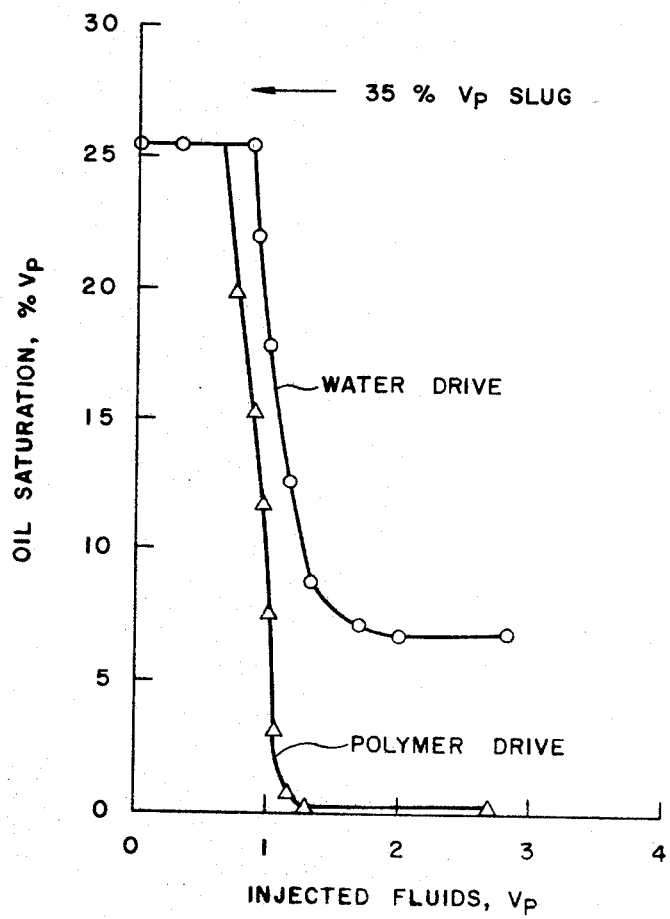

Oil displacement curves, obtained with 35% PV slugs of the above-mentioned system, with and without polymeric water-thickening materials, appear in FIGURE 4. These include the displacement of the aqueous slugs with distilled water as well as with a 0.025% solution of a polymeric thickener (Separan AP 30) in distilled water. In the thickened distilled water the Brookfield viscosity was 23.8 cp. at 6 r.p.m. and 8.4 cp. at 60 r.p.m. It will be noted that, where the surfactant slug was followed by The inclusion of the ethoxy sulfate increased the salt tolerance (since for the same sulfonate free of the sulfate the salt concentration would have caused flocculation) and also increased the oil recovery.

Tests of slugs in consolidated cores

The aqueous chemical slugs were displaced with aqueous solutions consisting of 250 p.p.m. Separan AP 30 in 0.025 M NaCl, i.e., as frontal portions of a viscosity-enhanced waterflood. The measured viscosity (Brookfield, U.L.) of this polymer solution at 6 r.p.m. is 4.0 cp. Two chemical slugs were tested, one containing 0.7 M NaCl with 400 p.p.m. $Ca^{++}$ and another containing 1.0 M NaCl without $Ca^{++}$.

The results shown in Table 4 are indicative of the operability of 30% VP slugs in Berea sandstone cores (of the type described above) in the presence of high salt concentrations, e.g., 1.0 M NaCl (58,000 parts per million), although the same sulfonate, by itself, would be incompatible with a salt concentration of 0.35 M. In addition, the presence of the specified amount of calcium ion improved, rather than reduced, the efficiency of the oil recovery.

TABLE 4.—APPLICATION OF BLENDED SURFACTANT SLUGS (30% VP) WITH POLYMER DRIVE-BEREA CORES

| Composition, chemical slug | | $S_{v'}$ (percent VP) waterflood | Oil saturation (percent VP) after flooding with chemical slug and pusher | |
|---|---|---|---|---|
| Surfactant | Electrolyte | | 1 VP | 1.5 VP |
| 4% Na petroleum sulfonate (M.W.= 430)<br>1% Na sulfated $C_{12-15}$ alcohol (3 EO) | 1.0 M NaCl | 39.5 | 11.3 | 8.8 |
| 4% Na petroleum sulfonate (M.W.=430)<br>1% Na sulfated $C_{12-15}$ alcohol (3 EO) | 0.7 M NaCl<br>400 p.p.m. Ca** | 41.0 | 10.4 | 6.9 |

The effect of ethylene oxide units (EO) in the sulfated alcohol on the sulfonate-sulfate mixture is shown by the data presented in Table 5 below.

TABLE 5.—THE EFFECT OF EO CONTENT OF THE Na SULFATED $C_{12-15}$ ALCOHOL

[Displacement of residual crude oil from sand packs with 80/20 mixture of Na petroleum sulfonate (M.W.=430) and Na sulfated $C_{12-15}$ alcohol (Total surfactant, 5%; $S_{or}$ about 25% PV)]

| EO United per Molecule | Conc. NaCl, M | Oil Saturation During Chemical Flood; PV Chemical Flood | | |
|---|---|---|---|---|
| | | 1.0 | 1.25 | 1.5 |
| Na sulfated $C_{12-15}$ alcohol (0 EO) | 0.25 | ¹24.9 | 22.5 | 21.0 |
| Na sulfated $C_{12-15}$ alcohol (1 EO) | 0.40 | ¹23.0 | 21.7 | 20.5 |
| Na sulfated $C_{12-15}$ alcohol (3 EO) | 0.90 | 4.4 | 0.4 | 0.4 |
| Na sulfated $C_{12-15}$ alcohol (5 EO) | 1.20 | 10.7 | 1.1 | 1.1 |
| Na sulfated $C_{12-15}$ alcohol (9 EO) | 0.80 | 18.2 | 5.0 | 0.5 |

¹ No oil bank produced since saturation was reduced by a solubilization process.

It will be noted from Table 5 that for the reservoir simulated by the experiment and for an 80/20 ratio of petroleum sulfonate to Na sulfated $C_{12-15}$ alcohol sulfate, the 3 EO product gives the best results. Na sulfated $C_{12-15}$ alcohol (5 EO) was the next best.

Effect of sulfate on high molecular weight sulfonates

A series of oil recovery experiments were conducted in sand packs to test the effects of the sulfate when blended with a 470 M.W. mahogany sulfonate of very limited water solubility. The results are summarized in the following Table 6.

TABLE 6.—RECOVERY OF BENTON CRUDE OIL FROM OTTAWA SAND PACKS

[Blends of 400 M.W. mahogany sulfonate and Na sulfated $C_{12-15}$ alcohol ethoxylates 5% solutions]

| EO Units per Molecule | Mahogany Sulfonate Na Sulfated $C_{12-15}$ Alcohol | NaCl,¹ M | Oil Saturation Following: | | |
|---|---|---|---|---|---|
| | | | 1.0 VP | 1.25 VP | 1.5 VP |
| 4 | 70/30 | 1.6 | 8.2 | 0 | |
| | 50/50 | 3.0 | 13.2 | 0.8 | 0.8 |
| | 30/70 | 4.0 | 0.7 | 0 | |
| 6 | 70/30 | 1.7 | 10.4 | 9 | |
| | 50/50 | 3.5 | 8.4 | 0.5 | 0.4 |
| | 40/60 | 4.0 | 1.5 | 0.1 | 0.1 |

¹ Optimum, for oil recovery.

The results are indicative of the following:

(1) Efficient oil recovery can be obtained with optimum aqueous combinations of Na sulfated $C_{12-15}$ alcohol, 470 M.W. mahogany sulfonate and electrolyte.

(2) Considerably higher ratios of Na sulfated $C_{12-15}$ alcohol sulfate to petroleum sulfonate are desirable with the 470 M.W. sulfonate than with 430 M.W. sulfonate. In some instances superior results are obtained with systems containing more Na sulfated $C_{12-15}$ alcohol than magogany sulfonate.

(3) The systems which exhibited the most efficient oil recoveries in sand packs contained relatively high salt concentrations—as high as 4 molar NaCl.

Adsorptive properties

Surfactant materials tend to become adsorbed on the surfaces of porous earth formations. In waterflooding oil recovery operations, it is often necessary to use more surfactant than is needed for lowering the interfacial tension, in order to compensate for the loss due to adsorption.

Aqueous solutions of the specified surfactants were equilibrated with the specified adsorbents in order to compare the adsorptive properties of the present mixtures of sulfated-sulfonate surfactants with those of a mixture of sulfonate surfactants. The results are indicated in FIGURES 5 and 6. FIGURE 5 compares the adsorptive characteristics of aqueous solutions of sulfate-sulfonate mixtures and aqueous solutions of petroleum sulfonate on a common sandstone (Berea). It is evident that adsorption is considerably less in the case of the mixture. This is significant in view of its higher salinity, 0.4 N, and the tendency for the adsorption of a surfactant to increase with increasing solution salinity. The petroleum sulfonate, without added Neodol 25–3S, is not even soluble at this high salt concentration. The beneficial effects that one can expect from added sulfated ethoxylates whenever the oil-bearing formation is predominantly carbonate are indicated by FIGURE 6. Even though the salinity of the aqueous solution of sulfate-sulfonate mixture is higher than that of the aqueous sulfonate solution by a factor of 2, adsorption on an aragonite (Bahamaöolites) surface is lower by a factor of ca. 4. These results in combination with the high calcium tolerance of these mixtures indicate that such mixtures are suitable oil recovery agents for use in carbonate formations such as limestone formations or formations containing significant amounts of carbonate minerals; an application that is outside the scope of other existing surfactant systems.

In general, the mixture of dissimilar anionic surfactants at least one of which is a salt of an organic sulfonate and at least one of which is a salt of a sulfated oxyalkylated material can be used to displace oil in the form of an aqueous saline solution that contains from about 0.1 to 10% by weight of surfactant material. The preferred range of such concentrations is from about 1 to 5% by weight of surfactant. Such aqueous saline solutions of the surfactants may contain, or be preceded by, or be followed by water thickening materials dissolved in aqueous liquids. The water thickening materials may comprise natural or synthetic polymeric materials such as water soluble gums and/or polymers such as partially hydrolyzed polyacrylamides.

It is understood that various changes in the details described to explain the invention can be made by persons skilled in the art within the scope of the invention as expressed in the appended claims.

We claim as our invention:

1. A method of producing oil from an oil-containing underground reservoir formation, the steps comprising:
    (a) injecting into said formation a slug of an aqueous saline solution containing a mixture of dissimilar anionic surfactants at least one of which is a salt of an organic sulfanate and at least one of which is a salt of a sulfated oxyalkylated alcohol, the cationic portion of each of said salts being selected from the group consisting of alkali metal, ammonium and amine; and, (b) flooding the treated formation under (a) with a fluid drive to effect oil recovery.

2. The process of claim 1 wherein the sulfonate is an alkali metal petroleum sulfonate and the sulfated compound is an alkali metal sulfated polyethoxylated primary aliphatic alcohol.

3. The process of claim 1 wherein the sulfonate is an alkali metal petroleum sulfonate and the sulfated compound is an alkali metal sulfated polyethoxylated secondary aliphatic alcohol.

4. The process of claim 1 wherein the sulfonate is a sodium salt of petroleum sulfonate and the sulfated compound is a sodium salt of sulfated polyethoxylated primary aliphatic alcohol.

5. The process of claim 4 wherein the sulfated compound contains from 1–10 ethylene oxide units in the molecule.

6. The process of claim 1 wherein the total anionic additive mixture concentration ranges from 1% to 20% by weight.

7. The process of claim 6 in which the surfactant-containing slug of aqueous saline water is injected as a frontal portion of an aqueous drive fluid.

8. The process of claim 7 wherein the drive fluid is water.

9. The process of claim 8 wherein the drive fluid is thickened water.

10. The process of claim 9 wherein the thickener is a hydrolyzed polymeric acrylamide salt.

11. The process of claim 9 wherein the surfactant-containing slug of aqueous saline water contains a thickening agent.

12. A method of producing oil from an oil-containing underground carbonate reservoir formation, the steps comprising:
(a) injecting into said formation a slug of an aqueous saline solution containing a mixture of dissimilar anionic surfactants at least one of which is a salt of an organic sulfonate and at least one of which is a salt of a sulfated oxyalkylated alcohol, the cationic portion of each of said salts being selected from the group consisting of alkali metal, ammonium and amine; and,
(b) flooding the treated formation under (a) with a fluid drive to effect oil recovery.

References Cited

UNITED STATES PATENTS

| | | | |
|---|---|---|---|
| 3,302,713 | 2/1967 | Ahearn et al. | 166—275 X |
| 3,315,744 | 4/1967 | Dunlap | 166—275 X |
| 3,330,344 | 7/1967 | Reisberg | 166—275 X |
| 3,332,486 | 7/1967 | McGhee | 166—274 |
| 3,348,611 | 10/1967 | Reisberg | 166—275 |
| 3,373,808 | 3/1968 | Patton | 166—275 |
| 3,437,141 | 4/1969 | Brandner et al. | 166—273 |

JAMES A. LEPPINK, Primary Examiner

I. A. CALVERT, Assistant Examiner

U.S. Cl. X.R.

166—275